United States Patent [19]

Motamedi et al.

[11] Patent Number: 5,445,576
[45] Date of Patent: Aug. 29, 1995

[54] ENGINE TORQUE MANAGEMENT DURING COAST DOWNSHIFTING OF AN AUTOMATIC SHIFT TRANSMISSION

[75] Inventors: Nader Motamedi, Rochester Hills; Larry T. Nitz, Rochester, both of Mich.

[73] Assignee: Saturn Corporation, Troy, Mich.

[21] Appl. No.: 77,155

[22] Filed: Jun. 16, 1993

[51] Int. Cl.$^6$ ............................................. F16H 59/50
[52] U.S. Cl. .................................... 477/105; 477/102; 477/109
[58] Field of Search ............... 477/101, 102, 109, 103, 477/105, 148

[56] References Cited

U.S. PATENT DOCUMENTS 5,046,174  9/1991  Lentz et al. ...................... 477/148
5,129,286  7/1992  Nitz et al. ........................ 477/102

Primary Examiner—Charles A. Marmor
Assistant Examiner—Sherry Lynn Estremsky
Attorney, Agent, or Firm—Vincent A. Cichosz

[57] ABSTRACT

An improved powertrain control which recognizes the occurrence of positive engine torque caused by accelerator walk-in by the operator during coast-sync-coast downshift, and effectively prevents or arrests speed flare via engine torque management controls. The engine spark timing is normally not responsive to coast-sync-coast downshift conditions, however, when the occurrence of accelerator walk-in results in excessive positive engine torque likely to cause, or actually causing, engine speed flare is detected, spark retard is controlled to a predetermined value, thereby controlling the transmission input torque and allowing smooth application of the on-coming element for completion of the shift.

8 Claims, 9 Drawing Sheets

ENGINE TORQUE MANAGEMENT DURING COAST DOWNSHIFTING OF AN AUTOMATIC SHIFT TRANSMISSION

This invention relates to downshift controls in a multi-speed ratio clutch-to-clutch automatic shift transmission, and more particularly, to a torque control specific to coast-sync-coast downshifting of the transmission.

BACKGROUND OF THE INVENTION

Motor vehicle transmissions of the type addressed by this invention include several fluid operated torque transmitting devices, referred to herein as clutches, which are automatically engaged and disengaged according to a predefined pattern to establish different speed ratios between input and output shafts of the transmission. The input shaft is coupled to an internal combustion engine through a fluid coupling such as a torque converter, and the output shaft is mechanically connected to drive one or more vehicle wheels.

The various speed ratios of the transmission are typically defined in terms of the ratio $Nt/No$, where $Nt$ is the input shaft speed and $No$ is the output shaft speed. Speed ratios having a relatively high numerical value provide a relatively low output speed and are generally referred to as lower speed ratios; speed ratios having a relatively low numerical value provide a relatively high output speed and are generally referred to as upper speed ratios.

Shifting between the various speed ratios generally involves disengaging a clutch associated with the current or actual speed ratio Ract, and engaging a clutch associated with the desired speed ratio Rdes. The clutch to be released is referred to as the off-going clutch, while the clutch to be engaged is referred to as the on-coming clutch. Shifts of this type are referred to as clutch-to-clutch in that no speed responsive or freewheeling elements are used.

Shifting is initiated in response to a comparison between measured and predetermined values of one or more load condition parameters. The parameters typically include vehicle speed so that the transmission is successively upshifted to the upper speed ratios as the vehicle speed is increased and successively downshifted to the lower speed ratios as the vehicle speed is decreased.

The present invention is directed to the control of clutch-to-clutch downshifting during coast conditions—that is, where the vehicle speed is decreasing, with or without application of the service brakes, at closed or light engine throttle settings. When performing coast downshifts, one objective is to time the shift so as to minimize driveline disruption. This means that the speed differential across the on-coming clutch should be at or near zero at the time of clutch engagement. Another objective is to maintain the establishment of a speed ratio which will provide adequate performance in the event the operator terminates the coast condition by increasing the engine throttle setting. This means that successive shifting should occur as the vehicle slows to a stop and that the neutral intervals between disengagement of an off-going clutch and engagement of an on-coming clutch should be minimized.

The above-noted coast-sync-coast shift controls were addressed by the clutch-to-clutch shift control method disclosed and claimed in the U.S. Pat. No. 5,036,729 to Nitz et al., assigned to General Motors Corporation, and issued on Aug. 6, 1991. According to that control method, the coast downshifts are initiated at a point where, without the employed engine control contained therein for synchronizing the engine speed with the transmission input speed, the input speed would otherwise exceed the engine speed. In automotive terms, the shift is referred to as a coast-sync-coast shift since (1) it is initiated at a coast condition where the input speed is higher than the engine speed, (2) it is completed at a synchronous condition where the speed differential across the on-coming clutch is at or near zero, and (3) a coast condition recurs immediately after the shift.

In operation, the coast-sync-coast downshift comprises Preamble, Neutral, Fill and Completion phases. In the Preamble phase, the torque converter is released (if locked), and the engine control is adjusted to progressively increase the engine speed. Engine control may be achieved via adjustment of an idle air control (IAC) unit which admits a controlled amount of air downstream of the engine throttle for idle speed regulation. The IAC unit is adjusted to a limit value which defines a known flow condition, the limit value being scheduled in relation to a measure of the barometric pressure so that the known flow condition occurs regardless of altitude. When the speed differential across the torque converter indicates that the engine torque is sufficient to accelerate the input shaft of the transmission, the control enters the Neutral phase.

In the Neutral phase, the off-going clutch is disengaged to allow the transmission input speed to rise toward the synchronous speed of the lower speed ratio. When the input speed nears the synchronous speed, the engine control is removed to avoid overshooting and the control enters the Fill phase.

In the Fill phase, the on-coming clutch is filled with transmission fluid in preparation for engagement, and the engine control is modulated, if necessary, to maintain the input speed substantially at the synchronous speed. When the on-coming clutch is ready for engagement, the control enters the Completion phase during which the engine control is returned to its normal setting and the pressure supplied to the on-coming clutch is progressively increased to engage the clutch and complete the shift.

A difficulty arises with the above-described transmission controls during a downshift when engine speed flares beyond the synchronous speed. In this situation, the scheduled pressure may be inadequate to control engine torque. This is particularly significant if the speed flare occurs over an extended period of time as the inadequacy of torque containment by the on-coming clutch pressure can be detrimental to the on-coming clutch. One manner of addressing the above situation is to apply the on-coming clutch at high pressure in order to bring the flare immediately under control. This, however, may result in an unpleasant shift bump readily perceived by the operator. An alternative manner of addressing the situation and further substantially limiting or eliminating any perceived bump attempts to control the on-coming clutch torque capacity to smoothly take-up the flare. Proper pressure scheduling may be difficult to control due to the dynamic nature of any given flare event and consequently even small errors toward under torque capacity will lead to continued flare and possible clutch damage if the flare persists for an excessive period. Additionally, with either of the two techniques described above, the flare which occurs may produce objectional noise related to the severity thereof.

SUMMARY OF THE PRESENT INVENTION

In a mechanization of a clutch-to-clutch transmission control employing this invention, the control includes an improved powertrain control which recognizes the occurrence of an operating condition likely to result in the application of the oncoming clutch at a high pressure (high pressure being necessary to bring engine speed flare under immediate control) accompanied by an unpleasant drive axle bump. Engine torque is managed through the use of predetermined spark timing control to prevent anticipated engine speed flare and reduce engine torque to thereby allow a smoother application of the oncoming clutch. Additionally, actual engine speed flare is checked almost immediately by even more aggressive spark timing control.

In the preferred embodiment, the engine is commanded to a higher synchronization speed in preparation for a downshift. The engine spark timing is normally not responsive to coast-sync-coast downshift conditions. However, when the occurrence of accelerator walk-in is detected after the shift has been committed to, the present invention controls the spark retard to a predetermined value, thereby controlling the transmission input torque and allowing smooth application of the on-coming element for completion of the shift. The torque control of the present invention may prevent engine speed flare in anticipation thereof or check engine speed flare when it actually occurs.

DETAILED DESCRIPTION OF THE DRAWINGS

Figure 1A:
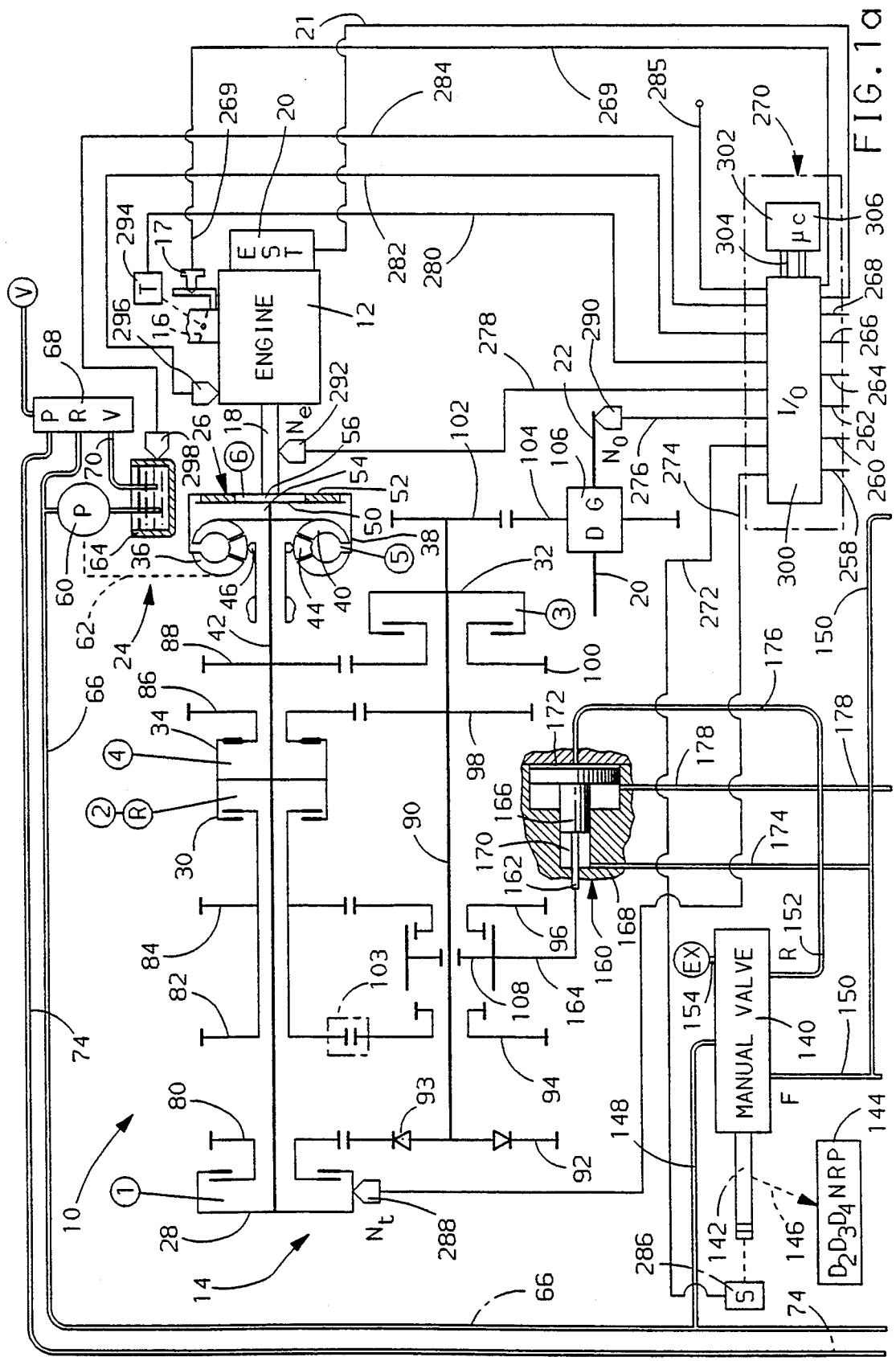
FIGS. 1a–1b schematically depict a computer-based electronic transmission control system controlled according to this invention.
Figure 1B:
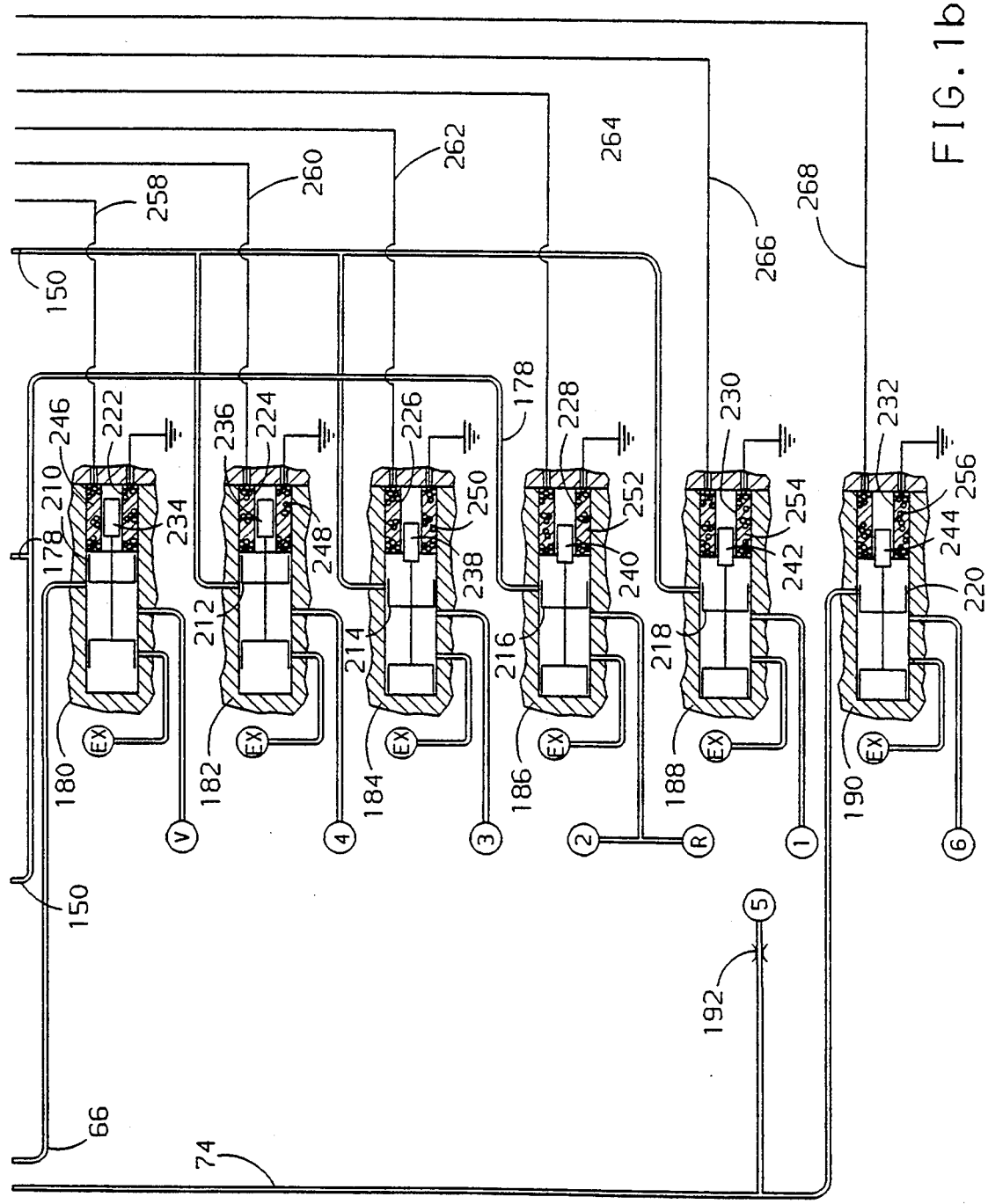

Referring particularly to FIGS. 1a and 1b, the reference numeral 10 generally designates a motor vehicle drivetrain including an engine 12 and a parallel shaft transmission 14 having a reverse speed ratio and four forward speed ratios. Engine 12 includes a throttle mechanism 16 mechanically connected to an operator manipulated device, such as an accelerator pedal (not shown), for regulating the air intake of the transmission. An idle air control (IAC) unit 17, as is conventionally employed for idle speed regulation in various vehicles manufactured and sold by General Motors Corporation, defines a by-pass path through which a limited amount of auxiliary air is admitted downstream of the throttle 16. The IAC unit 17 is electrically controlled via line 269 to regulate the amount of by-pass air. The engine is fueled by a conventional method in relation to the combined air intake to produce output torque in proportion thereto. Such torque is applied to the transmission 14 through the engine output shaft 18. The transmission 14, in turn, transmits engine output torque to a pair of drive axles 20 and 22 through a torque converter 24 and one or more of the fluid operated clutches 26–34, such clutches being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14. The torque converter 24 also includes a clutch 26 comprising a clutch plate 50 secured to the shaft 42. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56. When the fluid pressure in the apply chamber 54 exceeds that in the release chamber 56, the friction surface 52 of clutch plate 50 is moved into engagement with the input shell 38 as shown in FIG. 1, thereby engaging the clutch 26 to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36 as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in the U.S. Patent to Schuster U.S. Pat. No. 4,342,545, issued Aug. 3, 1982, and a representative pressure regulator valve is disclosed in the U.S. Patent to Vukovich U.S. Pat. No. 4,283,970, issued Aug. 18, 1981, such patents being assigned to General Motors Corporation.

The transmission shaft 42 and a further transmission shaft 90 each have a plurality of gear elements rotatably supported thereon. The gear elements 80–88 are supported on shaft 42 and the gear elements 92–102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutches 28–34 each comprise an input member rigidly connected to a transmission shaft 42 or 90, and an output member rigidly connected to one or more gear elements such that engagement of a clutch couples the respective gear element and shaft to effect a driving connection between the shafts 42 and 90. The clutch 28 couples the shaft 42 to the gear element 80; the clutch 30 couples the shaft 42 to the gear elements 82 and 84; the clutch 32 couples the shaft 90 to the gear element 100; and the clutch 34 couples the shaft 42 to the gear element 86. Each of the clutches 28–34 is biased toward a disengaged state by a return spring (not shown). Engagement of the clutch is effected by supplying fluid pressure to an apply chamber thereof. The resulting torque capacity of the clutch is a function of the applied pressure less the return spring pressure, hereinafter referred to as the working pressure. The circled numeral 1 represents a fluid passage for supplying pressurized fluid to the apply chamber of clutch 28; the circled numeral 2 and letter R represent a fluid passage for supplying pressurized fluid to the apply chamber of the clutch 30; the circled numeral 3 represents a fluid passage for supplying pressurized fluid to the apply chamber of the clutch 32; and the circled numeral 4 represents a fluid passage for directing pressurized fluid to the apply chamber of the clutch 34.

The various gear elements 80–88 and 92–100 are relatively sized such that engagement of first, second, third and fourth forward speed ratios are effected by engaging the clutches 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutches 28–34 in a released condition. The speed ratios defined by the various gear element pairs are generally characterized by the ratio of the turbine speed Nt to output speed No. Representative Nt/No ratios for transmission 14 are as follows:

| First | 2.368 | Second | 1.273 |
| Third | 0.808 | Fourth | 0.585 |
| Reverse | 1.880 | | |

Clutch-to-clutch shifting from a current speed ratio to a desired speed ratio requires the disengagement of an off-going clutch associated with the current speed ratio and the engagement of an on-coming clutch associated with the desired speed ratio. For example, a downshift from the Fourth speed ratio to the Third speed ratio involves disengagement of the clutch 34 and engagement of the clutch 32. As described in detail below, the present invention is directed to a control method for performing clutch-to-clutch downshifts under coast conditions such that the shift is initiated during a coast condition, completed at a synchronous condition, and followed by a coast condition. This is referred to herein as a coast-sync-coast downshift.

The fluid control elements for effecting engagement and disengagement of the clutches 26–34 include a manual valve 140, a directional servo 160 and a plurality of electrically operated fluid valves 180–190. The manual valve 140 operates in response to operator demand and serves, in conjunction with directional servo 160, to direct regulated line pressure to the appropriate fluid valves 182–188. The fluid valves 182–188, in turn, are individually controlled to direct fluid pressure to the clutches 28–34. The fluid valve 180 is controlled to direct fluid pressure from the pump output line 66 to the pressure regulator valve 68, and the fluid valve 190 is controlled to direct fluid pressure from the line 74 to the clutch 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148 and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3, or D2 positions shown on the indicator mechanism 144, line pressure from the line 148 is directed to the forward (F) output line 150. When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the second or reverse speed ratio is not effected until engagement of the clutch 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180–190 each receive fluid pressure at an input passage thereof from the pump 60, and are individually controlled to direct fluid pressure to the pressure regulator valve 68 or respective clutches 26–34. The fluid valve 180 receives line pressure directly from pump output line 66, and is controlled to direct a variable amount of such pressure to the pressure regulator valve 68 as indicated by the circled letter V. The fluid valves 182, 186 and 188 receive fluid pressure from the forward output line 150 of manual valve 140, and are controlled to direct variable amounts of such pressure to the clutches 34, 32 and 28 as indicated by the circled numerals 4, 3 and 1, respectively. The fluid valve 186 receives fluid pressure from the forward output line 150 and the directional servo output line 178, and is controlled to direct a variable amount of such pressure to the clutch 30 as indicated by the circled numeral 2 and the circled letter R. The fluid valve 190 receives fluid pressure from line 74 of pressure regulator valve 68, and is controlled to direct a variable amount of such pressure to the release chamber 56 of the clutch 26 as indicated by the circled numeral 6. The apply chamber 54 of the clutch 26 is supplied with fluid pressure from the output line 74 via the orifice 192 as indicated by the circled numeral 5.

Each of the fluid valves 180–190 includes a spool element 210–220, axially movable within the respective valve body for directing fluid flow between input and output passages. When a respective spool element 210–220 is in the rightmost position as viewed in FIG. 1, the input and output passages are connected. Each of the fluid valves 180–190 includes an exhaust passage as indicated by the circled letters EX, such passage serving to drain fluid from the respective clutch when the spool element is shifted to the leftmost position as viewed in FIG. 1. In FIG. 1, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180–190 includes a solenoid 222–232 for controlling the position of its spool element 210–220. Each such solenoid 222–232 comprises a plunger 234–244 connected to the respective spool element 210–220 and a solenoid coil 246–256 surrounding the respective plunger. One terminal of each such solenoid coil 246–256 is connected to ground potential as shown, and the other terminal is connected to an output line 258–268 of a control unit 270 which governs the solenoid coil energization. As set forth hereinafter, the control unit 270 pulse-width-modulates the solenoid coils 246–256 according to a predetermined control algorithm to regulate the fluid pressure supplied to the pressure regulator 68 and the clutches 26–34, the duty cycle of such modulation being determined in relation to the desired magnitude of the supplied pressures.

Input signals for the control unit 270 are provided on the input lines 272–284. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276 and 278, respectively. The speed transducer 288 senses the velocity of the transmission shaft 42 and therefore the turbine or transmission input speed Nt; the speed transducer 290 senses the velocity of the drive axle 22 and therefore the transmission output speed No; and the speed transducer 292 senses the velocity of the engine output shaft 18 and therefore the engine speed Ne. The position transducer (T) 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. The barometric pressure, used in connection with the IAC control according to this invention, is calculated as a function of the MAP signal on line 282. A temperature sensor 298 senses the temperature of the oil in the transmission fluid reservoir 64 and provides an electrical signal in accordance therewith to control unit 270 via line 284.

The control unit 270 responds to the input signals on input lines 272–284 according to a predetermined control algorithm as set forth herein, for controlling the operation of idle air unit 17 and fluid valve solenoid coils 246–256 via output lines 258–269. As such, the control unit 270 includes an input/output (I/O) device 300 for receiving the input signals and outputting the various control signals, and a microcomputer 302 which communicates with the I/O device 300 via an address-and-control bus 304 and a bi-directional data bus 306. In the case of IAC unit 17, the control may be effected directly by the control unit 270 as shown, or by an engine control unit (not shown) which operates in response to the control signal generated by control unit 270 on line 269.

Figure 2:
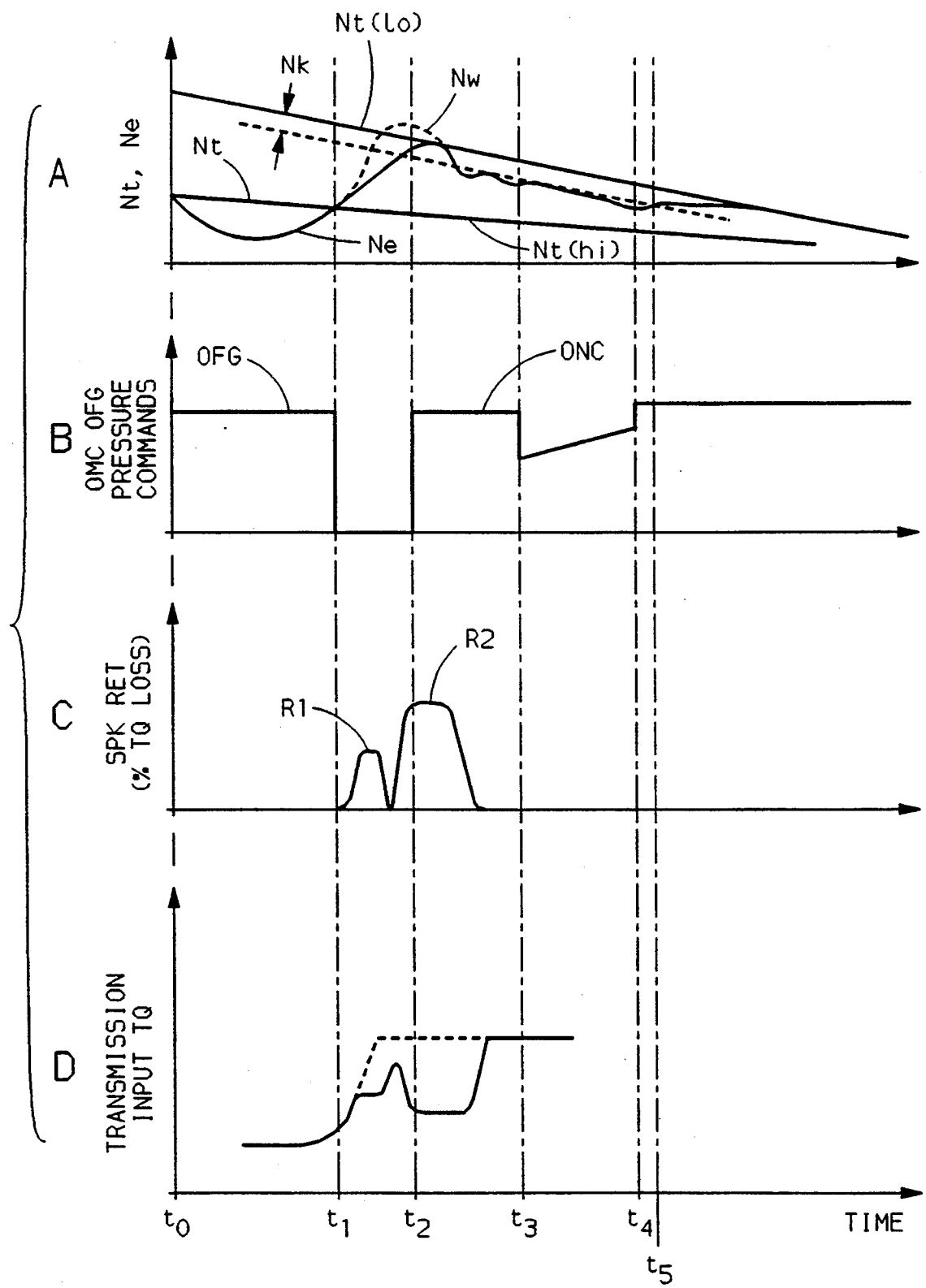
FIG. 2 graphically depicts various transmission and control parameters occurring during the course of a coast-sync-coast downshift.

FIG. 2 graphically depicts a coast-sync-coast downshift according to the present invention for the clutch-to-clutch automatic transmission of FIGS. 1a–1b. Graph A depicts the engine speed Ne, as well as the synchronous speeds Nt(lo) and Nt(hi) for the lo and high speed ratios, respectively. Graph B depicts the on-coming and off-going clutch pressure commands; Graph C depicts the spark retard signal applied to line 21 by control unit 270; and Graph D depicts the transmission input torque.

Coast-sync-coast downshifts according to the invention comprise Preamble, Neutral, Fill and Completion phases as described, for example, in U.S. Pat. No. 5,036,729 to Nitz et al., issued Aug. 6, 1991. The Preamble phase is initiated at time t0 in response to the achievement of a specified vehicle speed and engine throttle condition. At such point, the torque converter clutch 26 is disengaged (if engaged), and the setting of the IAC unit 17 is progressively increased toward a limit setting.

Although the turbine speed Nt remains at the synchronous speed Nt(hi) of the hi speed ratio, the release of converter clutch 26 allows the engine speed Ne to fall toward its idle setting, as seen in the Ne trace of Graph A. Shortly thereafter, however, the increased air intake supplied by IAC unit 17 catches and accelerates the engine, narrowing the gap between Ne and Nt.

At time t1, the engine torque is sufficient to accelerate the turbine shaft 42 to the synchronous speed Nt(lo) of the lo speed ratio. At this point, the control enters the Neutral phase by disengaging the off-going clutch 34. This allows the engine and turbine speeds Ne, Nt to rise substantially together toward Nt(lo).

At time t2, the turbine speed Nt is within a predetermined speed Nk of Nt(lo), and the control enters the Fill phase. In the Fill phase, the engine idle air control command is ramped toward zero to avoid overshooting of the synchronous speed Nt(lo), and the apply cavity of on-coming clutch 32 is filled with fluid in preparation for engagement. Thereafter, the idle air control command operates to maintain Nt substantially at Nt(lo)−Nk.

When the on-coming clutch fill period is over at time t3, the control enters the Completion phase. In the Completion phase, the idle air command is ramped to zero and the pressure supplied to on-coming clutch 32 is progressively increased to engage the clutch 32. A coast condition then recurs as the turbine speed Nt is brought into correspondence with the synchronous speed Nt(lo). At time t4, the clutch 32 is fully engaged, completing the shift. As an optional measure, the torque converter clutch 26 is progressively re-engaged beginning at time t5.

If, however, operator accelerator walk-in occurs at any time during the Neutral phase (t1–t3), neither subject clutch has capacity and engine and turbine speed are caused to change positively at a rate responsive to the operator input. If the walk-in is severe enough, and absent of a control responsive to such an operator induced event, engine and turbine speed may overshoot the synchronous speed Nt(lo) and the scheduled pressure for the oncoming clutch may be insufficient to control the resultant input torque, thereby resulting in flare and potential clutch damage. The control of the present invention avoids the above described situation and the shortfalls of the prior art solutions by recognizing the occurrence of accelerator walk-in which is likely to result in engine speed flare during coast-sync-coast downshifting, and effectively reduces the input torque through the use of spark timing controls to thereby prevent anticipated engine speed flare and associated excessive input torque. The scheduled on-coming pressure, which is a function of the input torque and spark retard, is therefore scheduled in a manner which accounts for the torque control initiated by the accelerator walk-in. Moreover, if actual engine speed flare does occur after accelerator walk-in, such as may be the case with a heavy walk-in, more aggressive spark timing control is employed to similarly check the flare and reduce the input torque to thereby allow smooth application of the on-coming clutch.

In the illustrated embodiment, and consistent with practice in the art, spark timing retardation is not normally employed during coast-sync-coast downshifting for engine torque reduction. This follows since, as described above, it is desirable to increase turbine speed for synchronization; spark retardation, of course, has the opposite effect on turbine speed. The control of this invention, however, introduces retardation to control the engine output torque in the event of operator accelerator walk-in so long as the downshift has been committed to and remains incomplete or engine speed flare is detected. When the shift is complete and/or engine speed flare is no longer observed, the normal spark timing controls are resumed.

The broken line portion Nw of Graph A is generally illustrative of an exemplary path engine and turbine speed would take if a moderate accelerator walk in were to occur and the control of the present invention were employed. The engine and turbine speed increase at a higher rate than that commanded by the IAC controls previously described and as generally illustrated by the solid line portion of the curve. The control recognizes that the engine response to the accelerator walk-in is likely to cause a flare condition and excessive input torque. Therefore, the control overrides the normal engine spark timing controls to effect an immediate and predetermined partial engine torque reduction. Additionally, upon actual engine speed flare—that is speed in excess of the desired synchronous speed—the control operates to likewise override the normal spark timing controls but according to a substantially more aggressive torque reduction schedule. The torque reduction is accounted for in the on-coming pressure scheduling thereby allowing application of the on-coming clutch at a torque capacity sufficient to effectuate a smooth gear transition. Graph C shows an exemplary spark retard signal SPKRET applied to line 21 by control unit 270 in response to the accelerator walk-in indicated by the broken line curve portion Nw of Graph A. A first portion of Graph C labeled R1 shows a first level of spark retard in response to potential flare and a second portion thereof labeled R2 shows a second level of spark retard in response to actual flare. The valley therebetween portions R1 and R2 corresponds substantially to the point of synchronous engine speed in the downshift. The peak value of SPKRET (corresponding to the maximum % torque loss) of portion R1 is less than the peak value of portion R2. Graph D depicts the transmission torque loss (solid line) corresponding to the spark retard signal occasioned by accelerator walk-in as exemplified by the broken line portion Nw of Graph A.

Figure 3:
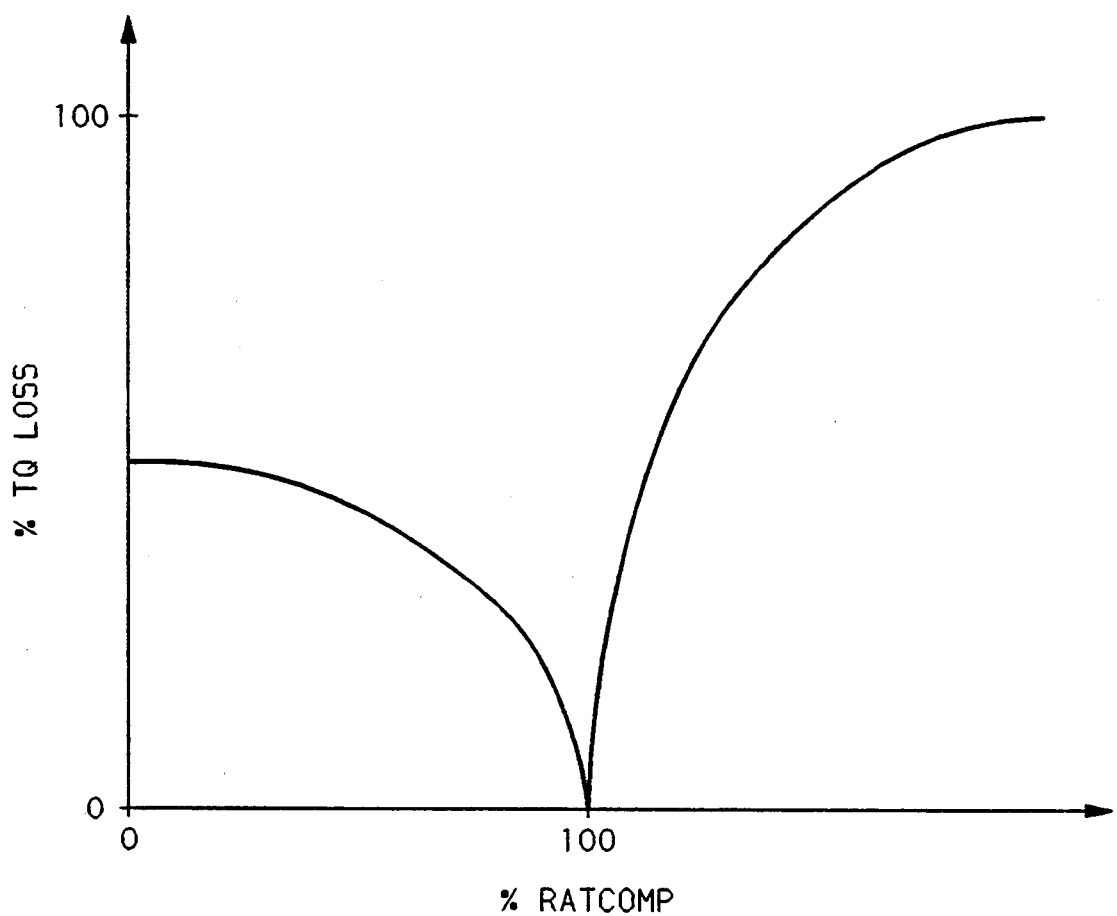
FIG. 3 graphically depicts the spark retard schedule employed during a coast-sync-coast downshift according to the present invention.

For the purpose of completeness, FIG. 3 depicts the applied spark retard in percent torque loss according to the present invention. A separate table may be employed to convert percent torque loss to a spark retard timing value appropriate for the current engine torque. As indicated above, spark retard is not normally scheduled during a coast-sync-coast downshift. However, where operator accelerator walk-in may potentially cause or actually does cause engine speed flare, spark retard is introduced as a function of a shift progression term %RATCOMP. The term %RATCOMP refers to the percentage of ratio completion, as judged by the ratio Nt/No relative to the initial and target ratio values. The portion of the curve to the left of 100% %RATCOMP corresponds to a yet to be completed shift and, therefore, anticipated engine speed flare. It is noted that too aggressive a spark retard in anticipation of flare may result in the turbine speed never reaching a synchronous speed and therefore the undesirable result of non-completion of the shift. Thus, spark retard and corresponding torque reduction in this region must be tempered with the desired result of shift completion. This is exemplified in the preceding FIG. 2, Graph C, portion R1. The portion to the right of 100% %RATCOMP corresponds to actual engine speed flare beyond the synchronous speed. It is noted that in the region of actual flare the schedule of spark retard is significantly more aggressive than it is in the anticipated flare region since, consistent with the preceding description, slippage across the oncoming clutch may be present and clutch damage could result therefrom. This is exemplified in the preceding FIG. 2, Graph C, portion R2.

Figure 4:
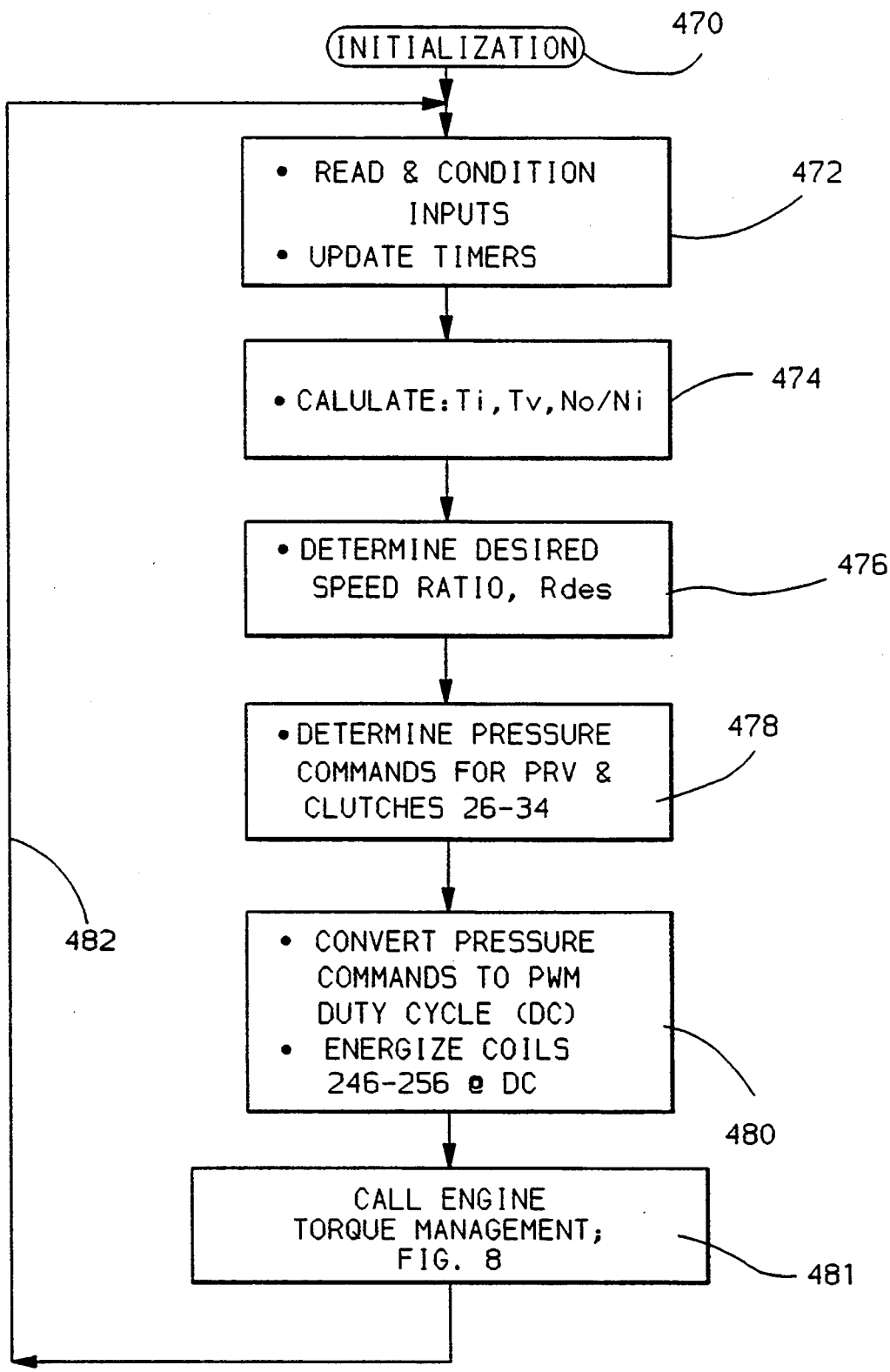
FIGS. 4, 5, 6, 7 and 8 depict flow diagrams executed by the computer-based controller of FIG. 1a in carrying out the control method of this invention.

The flow diagrams depicted in FIGS. 4, 5, 6, 7 and 8 represent program instructions to be executed by the microcomputer 302 of control unit 270 in mechanizing coast-sync-coast downshifting according to this invention. The flow diagram of FIG. 4 represents a main or executive program which calls various subroutines for executing particular control functions as necessary. The flow diagrams of FIGS. 5–8 represent the functions performed by those subroutines which are pertinent to the present invention.

Referring now more particularly to FIG. 4, the reference numeral 470 designates a set of program instructions executed at the initiation of each period of vehicle operation for initializing the various tables, timers, etc., used in carrying out the control functions of this invention. Following such initialization, the instruction blocks 472–480 are repeatedly executed in sequence as designated by the flow diagram lines connecting such instruction blocks and the return line 482. Instruction block 472 reads and conditions the various input signals applied to I/O device 300 via the lines 272–284, and updates (increments) the various control unit timers. Instruction block 474 calculates various terms used in the control algorithms, including the input torque Ti, the torque variable Tv, and the speed ratio No/Nt. Instruction block 476 determines the desired speed ratio, Rdes, in accordance with a number of inputs including throttle position, vehicle speed, and manual valve position. In transmission control, this function is generally referred to as shift pattern generation. Instruction block 478 determines the clutch pressure commands for effecting a ratio shift, if required. The IAC command and the pressure commands for the pressure regulator valve PRV and nonshifting clutches are also determined. An expanded description of the instruction block 478, especially in relation to coast downshifting, is set forth below in reference to the flow diagrams of FIGS. 5–7. Instruction block 480 converts the clutch and PRV pressure commands to PWM duty cycle based on the operating characteristics of the various actuators, and energizes the actuator coils accordingly. Instruction block 481 develops a spark retard signal on line 21 for EST unit 20 for engine torque management and flare control during shifting according to predetermined events. An expanded description of the instruction block 481 is set forth below in reference to the flow diagram of FIG. 8.

Figure 5:
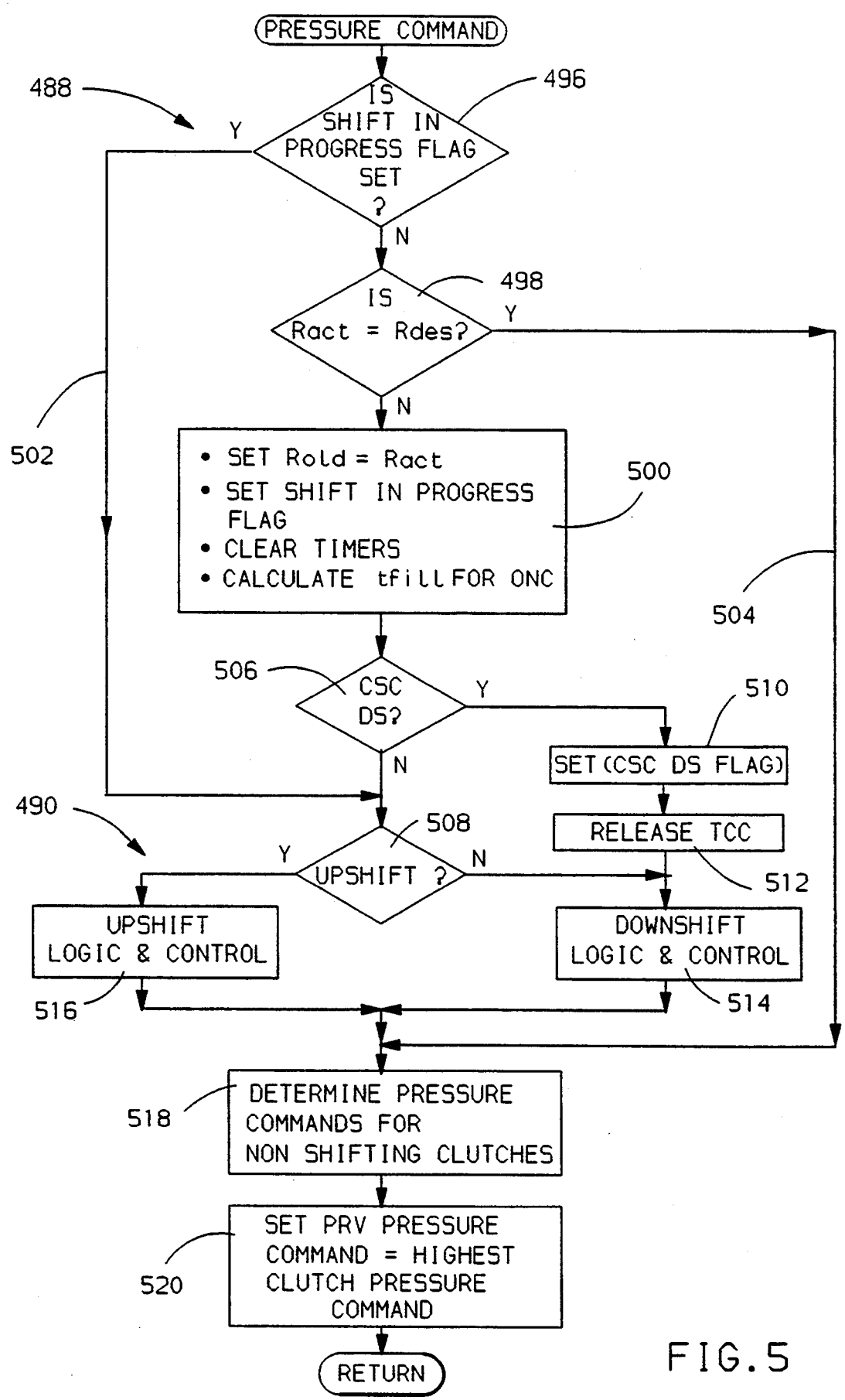
Figure 6:
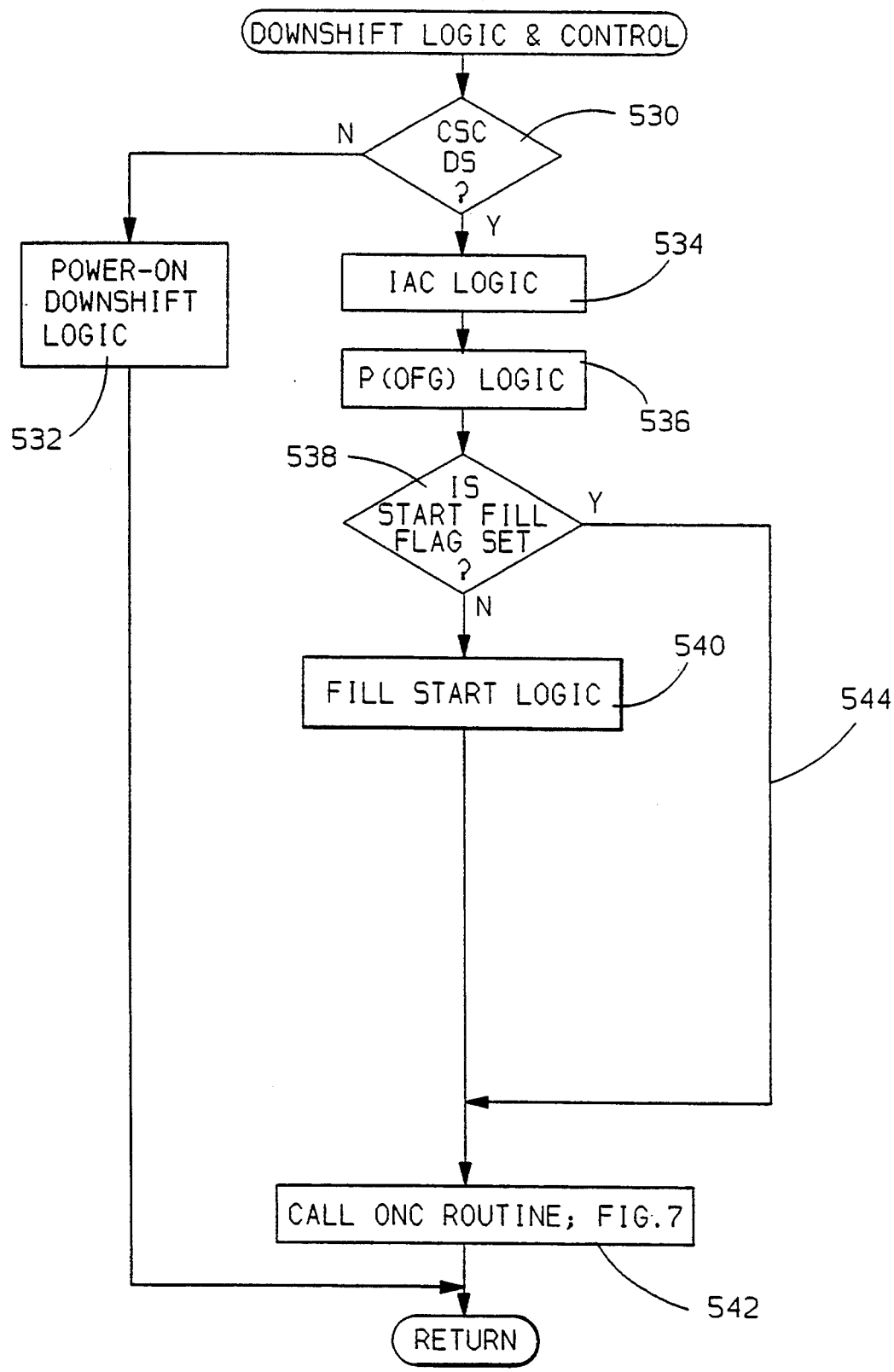
Figure 7:
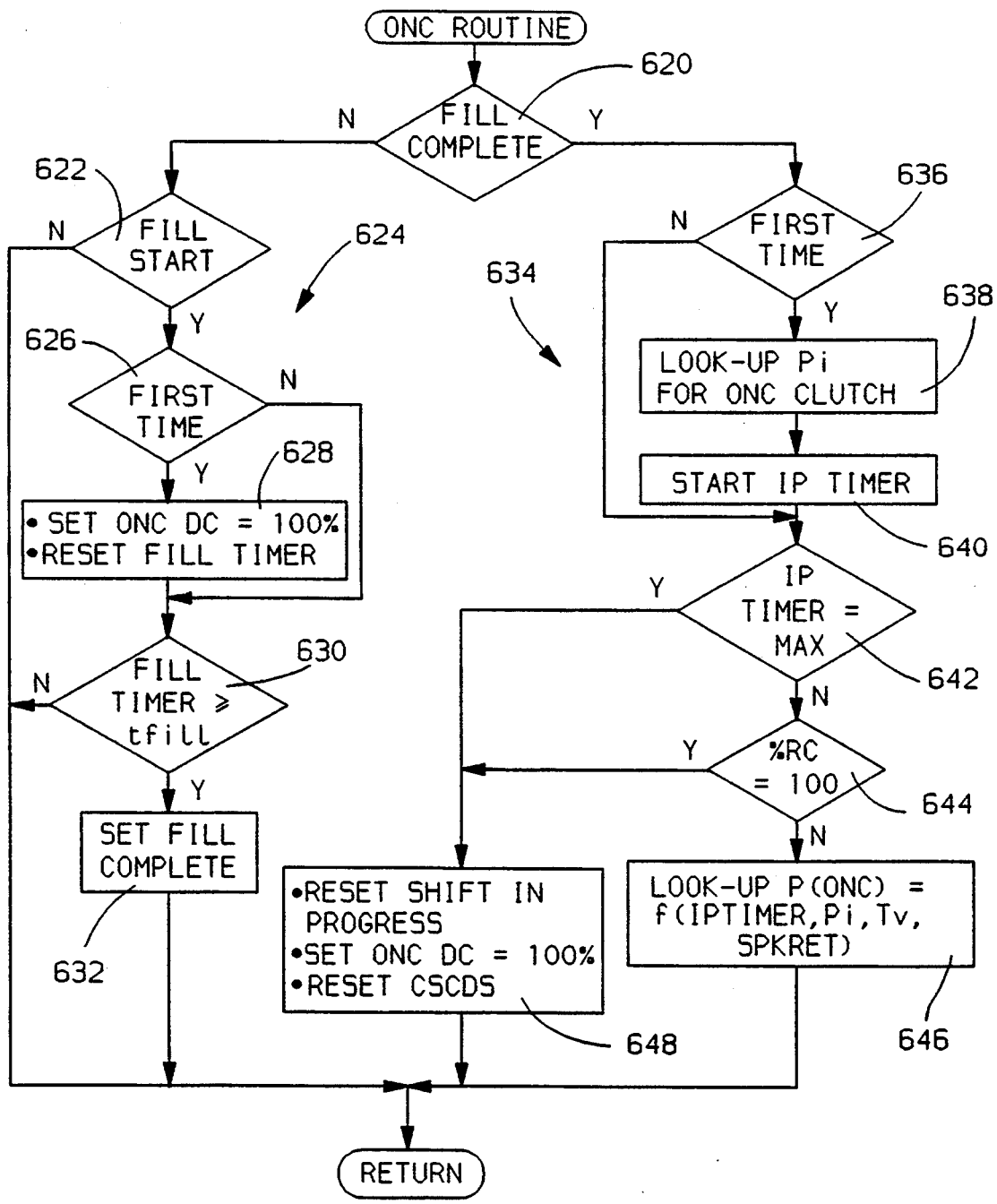

Referring to the PRESSURE COMMAND routine diagrammed in FIGS. 5–7, and particularly to FIG. 5, the blocks designated by the reference numeral 488 include the decision block 496 for determining if a shift is in progress as indicated by the "SHIFT IN PROGRESS" flag; the decision block 498 for determining if the actual speed ratio Ract is equal to the desired speed ratio Rdes determined at instruction block 476 of FIG. 4; and the instruction block 500 for setting up the initial conditions for a ratio shift. The instruction block 500 is only executed when decision blocks 496 and 498 are both answered in the negative. In such case, instruction block 500 serves to set the old ratio variable, Rold, equal to Ract, to set the "SHIFT IN PROGRESS" flag, clear the shift timers, and to calculate the fill time tfill for the on-coming clutch. A suitable calculation for the fill time tfill is set forth in the U.S. Pat. No. 4,653,350 to Downs et al., issued on Mar. 31, 1987. If a shift is in progress, the execution of blocks 498 and 500 is skipped, as indicated by the flow diagram line 502. If no shift is in progress, and the actual ratio equals the desired ratio, the execution of instruction block 500 and the blocks designated by the reference numeral 490 is skipped, as indicated by the flow diagram line 504.

The blocks designated by the reference numeral 490 include the decision block 506 for determining if the shift is a coast-sync-coast downshift (CSC DS) and the decision block 508 for determining if the shift is an upshift or a normal pattern downshift. If the shift is a coast-sync-coast downshift, the instruction blocks 510–512 are executed to set the CSC DS flag and to release the torque converter clutch 26 before calling the normal Downshift Logic & Control routine. The Downshift Logic & Control routine is further detailed in the flow diagram of FIGS. 6, but in general, develops pressure commands for the on-coming and off-going clutches of the shift. Similarly, the Upshift Logic and Control routine of block 516 is executed to develop pressure commands for on-coming and off-going clutches if the shift is an upshift.

Once the pressure commands, if any, for the on-coming and off-going clutches have been determined, the instruction blocks 518–520 are executed to determine pressure commands for the nonshifting clutches and to set the pressure command for the pressure regulator valve PRV to the highest of the clutch pressure commands.

Referring to the Downshift Logic & Control routine of FIG. 6, the decision block 530 is first executed to determine if the CSC DS flag is set. If not, the instruction block 532 is executed to develop clutch pressure commands for a power-on downshift, as disclosed for example, in the U.S. Pat. No. 4,653,351 to Downs et al., issued Mar. 31, 1987. If the CSC DS flag is set, instruction blocks 534 and 536 are executed to develop the position command for the IAC unit 17 and to develop the pressure command for the off-going clutch involved in the shift, as disclosed for example in U.S. Pat. No. 5,036,729 to Nitz et al., issued Aug. 6, 1991.

If the Fill phase has already begun, as determined at decision block 538, execution of instruction block 540 is skipped as indicated by the flow diagram line 544, and the ONC routine is called by the block 542. The ONC routine is detailed in FIG. 7 as indicated, and serves to develop the pressure command for the on-coming clutch involved in the shift. If the Fill phase has not yet begun, the instruction block 540 is executed to determine if the Fill phase should be started, as disclosed for example in U.S. Pat. No. 5,036,729 to Nitz et al.

Referring to the on-coming ONC routine of FIG. 7, the block 620 is first executed to determine if the Fill phase of the shift is complete. If the FILL START flag is set, as determined at block 622, but the Fill phase is not complete, the flow diagram portion 624 is executed to complete the on-coming fill. In the first execution of the fill period, as detected by block 626, the block 628 is executed to set the on-coming duty cycle ONC DC to 100% and to reset the FILL TIMER.

Once the FILL TIMER exceeds the predefined fill time tfill, as determined at block 630, the block 632 is executed to set the FILL COMPLETE flag. Thereafter, the flow diagram portion 634 is executed to complete engagement of the on-coming clutch. In the first execution of the flow diagram portion 634, as determined at block 636, the blocks 638 and 640 are executed to determine the initial pressure Pi for the on-coming engagement, and to start the inertia phase timer, IP TIMER. Until the count in IP TIMER reaches a limit value MAX, or the percent of speed ratio completion %RATCOMP reaches 100%, as determined by blocks 642 and 644, respectively, the block 646 is executed to determine the on-coming pressure command P(ONC) as a function of IP TIMER, Pi, the torque variable Tv and the spark retard value SPKRET which is output on line 21 to EST unit 20 according to the engine torque management routine of FIG. 8. Once either of the blocks 642–644 are answered in the affirmative, the block 648 is executed to complete the shift by setting the on-coming duty cycle ONC DC to 100%, and resetting the SHIFT IN PROGRESS and CSC DS flags.

Figure 8:
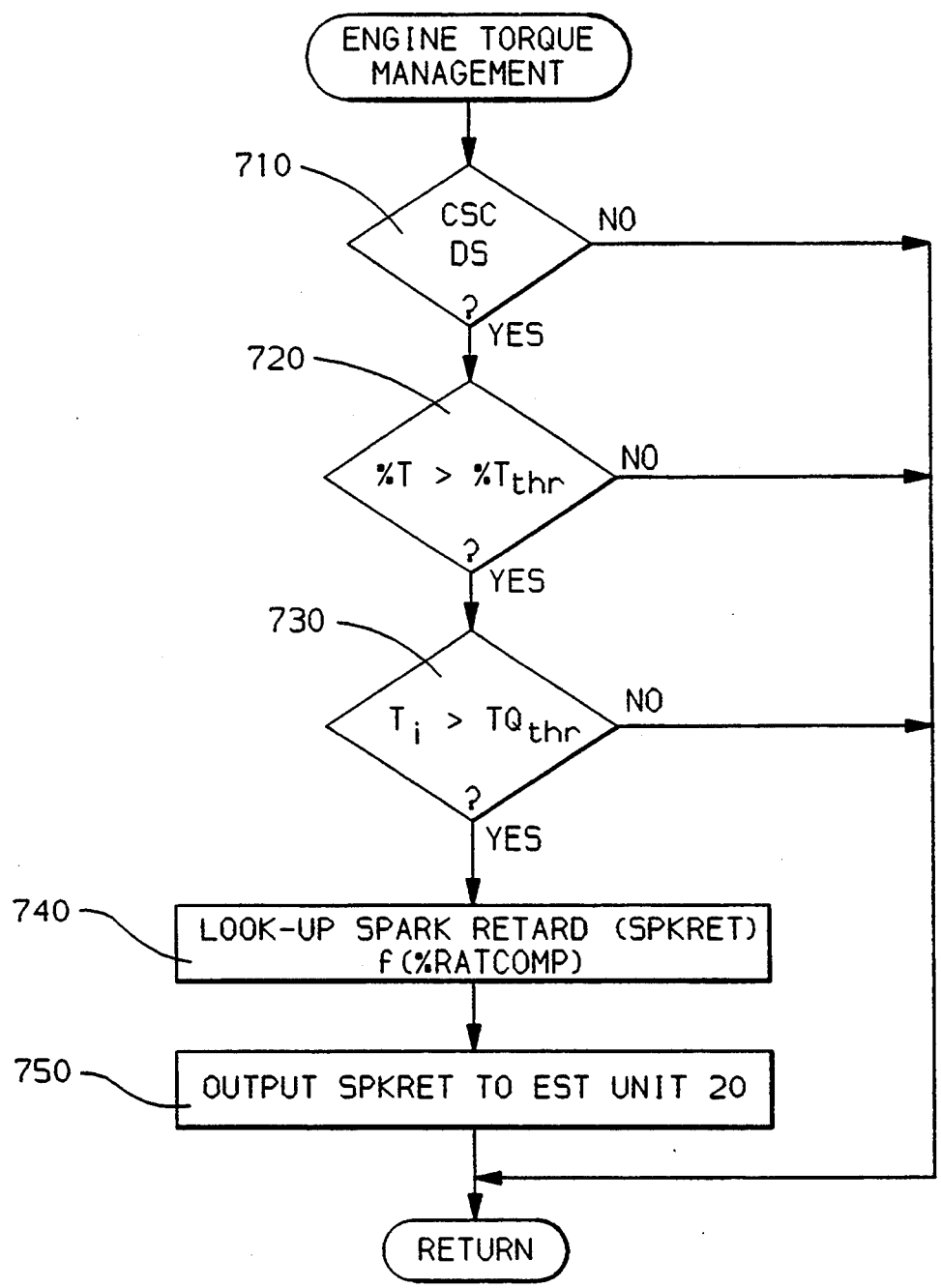

Referring finally to the Engine torque management routine of FIG. 8, the decision blocks 710–730 define entry conditions to the flare prevention and elimination spark retard control. If a coast-sync-coast downshift is in progress (decision block 710), the throttle position %T exceeds a threshold value %Tthr (decision block 720) and input torque Ti is greater than a threshold limit TQthr (decision block 730), the instruction blocks 740 and 750 are executed to look-up and output on line 21 a spark retard value SPKRET for producing the desired engine torque reduction. The spark retard look-up may be effected with an empirically determined table of spark retard vs. % engine torque loss, substantially as set forth in the U.S. Pat. No. 4,809,660, to Marsh et al., issued Mar. 7, 1989 and assigned to General Motors Corporation. Thus, the spark retard is maintained so long as the entry conditions are met.

If a coast-sync-coast downshift is not in progress, the throttle position is not greater than the threshold, or the input torque does not exceed the threshold limit, no spark retard is required and instruction blocks 740 and 750 are bypassed and no spark retard value is output on line 21.

While this invention has been described in reference to the illustrated embodiment, it is expected that various modifications will occur to those skilled in the art, and it should be understood that control methods incorporating such modifications may fall within the scope of this invention, which is defined by the appended claims.

The embodiments of the invention in which an exclusive property or privilege is claimed are defined as follows:

1. In a motor vehicle having an engine coupled through a transmission input shaft to supply torque to a multiple speed ratio transmission in accordance with operator demand, the transmission being downshifted from a first speed ratio to a second speed ratio by releasing an off-going fluid pressure supplied to a first friction element associated with said first speed ratio and supplying an on-coming fluid pressure to a second friction element associated with said second speed ratio, a method of downshifting the transmission from said first speed ratio to said second speed ratio during vehicle coast, comprising the steps of:

releasing said off-going fluid pressure to initiate a neutral phase;

estimating the torque supplied by said engine upon initiation of said neutral phase and thereafter until completion of said shift;

supplying on-coming fluid pressure to said second friction element in accordance with a predetermined pressure schedule based on said torque estimation and time;

during said neutral phase, monitoring the operator demand and detecting the occurrence of a specified operating condition which is likely to result in speed flare of the transmission input shaft beyond a predetermined synchronization speed;

during said neutral phase, monitoring the operator demand and detecting the occurrence of a specified operating condition which results in speed flare of the transmission input shaft beyond a predetermined synchronization speed; and controlling engine torque in response to the detection of said operating condition so as to limit the torque supplied by said engine, thereby to prevent potential speed flare and arrest actual speed flare of the transmission input shaft during said downshift due to operator demand.

2. In a motor vehicle having an engine coupled through a transmission input shaft to supply engine torque to a multiple speed ratio transmission, the transmission being downshifted during vehicle coast from a first speed ratio to a second speed ratio by releasing an off-going fluid pressure supplied to a first friction element associated with said first speed ratio, accelerating the transmission input shaft toward a synchronous speed corresponding to said second speed ratio and supplying an on-coming fluid pressure to a second friction element associated with said second speed ratio when the transmission input shaft speed attains substantially the synchronous speed, a method of preventing anticipated engine speed flare comprising the steps:

detecting an operating condition capable of producing a speed flare of the transmission input shaft beyond the synchronous speed; and, when the operating condition is detected during the downshift and the input shaft speed is below the synchronous speed, reducing the engine torque as a function of a shift progression term, the engine torque reductions at input shaft speeds below the synchronous speed intended to prevent an anticipated speed flare of the transmission input shaft while ensuring that the engine torque remains adequate to accelerate the input shaft toward the synchronous speed so as to ensure completion of the downshift.

3. The method as claimed in claim 2 further comprising the step:

when the operating condition is detected during the downshift and the input shaft speed is above the synchronous speed, reducing the engine torque in accordance with the function of the shift progression term, the engine torque reductions at input shaft speeds above the synchronous speed being more aggressive than the torque reductions at input shaft speeds below the synchronous speed.

4. In a motor vehicle having an engine coupled through a transmission input shaft to supply engine torque in accordance with operator demand and engine spark timing to a multiple speed ratio transmission, the transmission being downshifted during vehicle coast from a first speed ratio to a second speed ratio by releasing an off-going fluid pressure supplied to a first friction element associated with said first speed ratio, accelerating the transmission input shaft toward a synchronous speed corresponding to said second speed ratio and supplying an on-coming fluid pressure to a second friction element associated with said second speed ratio when the transmission input shaft speed attains substantially the synchronous speed, a method of preventing anticipated engine speed flare comprising the steps:

detecting an operating condition capable of producing a speed flare of the transmission input shaft beyond the synchronous speed;

when the operating condition is detected during the downshift and the input shaft speed is below the synchronous speed, reducing the engine torque as a function of a shift progression term, the engine torque reductions at input shaft speeds below the synchronous speed intended to prevent an anticipated speed flare of the transmission input shaft while ensuring that the engine torque remains adequate to accelerate the input shaft toward the synchronous speed so as to ensure completion of the downshift; and, when the operating condition is detected during the downshift and the input shaft speed is above the synchronous speed, reducing the engine torque in accordance with the function of the shift progression term, the engine torque reductions at input shaft speeds above the synchronous speed being more aggressive than the torque reductions at input shaft speeds below the synchronous speed.

5. The method as claimed in claim 4 wherein the shift progression term is determined by the ratio of an input speed of the transmission to an output speed of the transmission relative to the first and second speed ratios.

6. The method as claimed in claim 4 wherein the steps of reducing engine torque is carried out by retarding the engine spark timing.

7. The method as claimed in claim 4 wherein the operating condition comprises a throttle position exceeding a predetermined throttle position.

8. The method as claimed in claim 4 wherein the operating condition comprises the engine torque exceeding a predetermined engine torque.

* * * * *